US012781957B2

(12) United States Patent
Huang

(10) Patent No.: US 12,781,957 B2
(45) Date of Patent: Nov. 3, 2026

(54) TWISTING FLAME INTAKE APPARATUS FOR A HEATER

(71) Applicant: XueFeng Huang, Changzhou City (CN)

(72) Inventor: XueFeng Huang, Changzhou City (CN)

(73) Assignee: Well Traveled Imports, Amelia Island, FL (US)

( * ) Notice: Subject to any disclaimer, the term of this patent is extended or adjusted under 35 U.S.C. 154(b) by 680 days.

(21) Appl. No.: 18/130,614

(22) Filed: Apr. 4, 2023

(65) Prior Publication Data

US 2024/0068660 A1 Feb. 29, 2024

(30) Foreign Application Priority Data

Apr. 13, 2022 (CN) ......................... 202220855405.3

(51) Int. Cl.

*F23D 14/24* (2006.01)
*F23D 14/66* (2006.01)
(Continued)

(52) U.S. Cl.

CPC ............. *F23D 14/24* (2013.01); *F23D 14/66* (2013.01); *F23D 14/70* (2013.01); *F23D 14/02* (2013.01);
(Continued)

(58) Field of Classification Search

CPC .......... F23D 14/02; F23D 14/26; F23D 14/66; F23D 14/70; F23D 2203/1017; F23L 9/00; F24D 15/02; F24D 19/06; Y02B 30/00
(Continued)

(56) References Cited

U.S. PATENT DOCUMENTS 3,586,241 A * 6/1971 Virgil ...................... F23D 14/24 239/406
2006/0057518 A1 3/2006 Aldrich
(Continued)

OTHER PUBLICATIONS

Taina Matos, PCT International Search Report for PCT/IB2023/000189, Nov. 7, 2023, pp. 1-4.
Search History of PCT/IB2023/000189, pp. 1-2.
Taina Matos, PCTWritten Ipinion of the International Searching Authority for PCT/IB2023/000189, Nov. 7, 2023, pp. 1-6.

*Primary Examiner* — Gregory A Wilson
*Assistant Examiner* — Benjamin W Johnson
(74) *Attorney, Agent, or Firm* — Lau & Assocaites, PLC

(57) ABSTRACT

The present utility model relates to the technical field of gas heaters, and specifically relates to a rotary intake mechanism and a gas heater having the rotary intake mechanism. A rotary intake mechanism comprises a support plate and a housing, wherein a flame outlet is provided at the center of the housing, and a plurality of air duct pieces are further comprised; the support plate is provided inside of the housing; the plurality of air duct pieces are located between the support plate and the housing and are connected to the support plate and the housing; air ducts for air flowing are formed between adjacent air duct pieces; the air ducts are distributed spirally to form a wind field spiraling towards the center; the support plate is further provided with air inlet holes corresponding to the air ducts; and a furnace end mounting hole is provided at the center of the support plate. The present utility model designs a rotary intake mechanism with a simple structure and convenient manufacture. In addition, the gas heater has better effect of up-and-down convection of air by using the rotary intake mechanism. The combustion is more sufficient, the combustion height of the flame is increased, the rotary effect of the combustion flame is enhanced, and the ornamental value of the flame is improved.

12 Claims, 5 Drawing Sheets

(51) Int. Cl.

| | |
|---|---|
| ***F23D 14/70*** | (2006.01) |
| *F23D 14/02* | (2006.01) |
| *F23L 9/00* | (2006.01) |
| *F24D 15/02* | (2006.01) |
| *F24D 19/06* | (2006.01) |

(52) U.S. Cl.
CPC ......... *F23D 2203/1017* (2013.01); *F23L 9/00* (2013.01); *F24D 15/02* (2013.01); *F24D 19/06* (2013.01); *Y02B 30/00* (2013.01)

(58) Field of Classification Search
USPC ........................................................ 126/91 A
See application file for complete search history.

(56) References Cited

U.S. PATENT DOCUMENTS

| | | | | |
|---|---|---|---|---|
| 2007/0224562 | A1 | 9/2007 | Hiromitsu et al. | |
| 2010/0154779 | A1* | 6/2010 | Andors .................. | F24C 3/006 108/50.13 |
| 2010/0281872 | A1 | 11/2010 | Hadley et al. | |
| 2012/0263443 | A1 | 10/2012 | Yen | |
| 2013/0252188 | A1* | 9/2013 | Chen ...................... | F23D 14/10 431/355 |
| 2015/0167964 | A1* | 6/2015 | Chen ........................ | F23D 3/20 431/353 |
| 2017/0167724 | A1 | 6/2017 | Wang | |

* cited by examiner

TWISTING FLAME INTAKE APPARATUS FOR A HEATER

This application claims a foreign priority of Chinese Patent Application No. 202220855405.3 filed on Apr. 13, 2022, now patent No. CN ZL 2022 2 0855405.3 allowed on Sep. 9, 2022, which foreign priority of Chinese Patent Application, in its entirety, is incorporated herein by reference.

FIELD OF INVENTION

The present utility model relates to the technical field of gas heaters, and specifically relates to a rotary intake mechanism and a gas heater having the rotary intake mechanism.

BACKGROUND OF THE INVENTION

Outdoor gas heater has many characteristics, such as cleanness, efficiency and convenience, and has become the best tool for outdoor heating. In an outdoor heater, the gas is used as a supply gas source to generate a flame via a burner. The flame is burned in a transparent hood. We cannot only watch the bounce and rotation of the flame. Also, it transmits heat for warming via the transparent hood. However, when the existing gas heater is used, flame combustion is concentrated, heat dissipation is uneven, and energy efficiency is low.

Furthermore, the Chinese patent document with the publication number CN206709213U in the prior art discloses a gas heater, in which an air flow forms a spiral air flow through a flow guide cover. The flow guide cover is a concave open cover housing, and has a cumbersome manufacturing process and a high production cost.

OBJECT OF THE INVENTION

In view of the deficiencies of the prior art, the present utility model designs a rotary intake mechanism which has a simple structure, is convenient to manufacture and has a low manufacturing cost, and a gas heater using the rotary intake mechanism.

The technical solution of the utility model is as follows.

A rotary intake mechanism is characterized by comprising a support plate and a housing, wherein a flame outlet is provided at the center of the housing, and a plurality of air duct pieces are further comprised; the support plate is provided at the end or inside of the housing; the plurality of air duct pieces are located between the support plate and the housing and are connected to the support plate and the housing; air ducts for air flowing are formed between adjacent air duct pieces; the air ducts are distributed annularly to form a wind field spiraling towards the center; the support plate is further provided with air inlet holes corresponding to the air ducts; and a furnace end mounting hole is provided at the center of the support plate.

Further, a fireproof plate is provided in the flame outlet and fixed to the support plate, and a plurality of flame dividing holes is circumferentially distributed on the fireproof plate.

Further, a middle part of the fireproof plate is provided with a downward concave arc-shaped spherical protrusion.

Further, the number of the air duct pieces is three or more.

Further, the air duct piece comprises a first baffle piece, an arc-shaped baffle piece and a second baffle piece; one end of the first baffle piece is connected to one end of the arc-shaped baffle piece, and the other end of the arc-shaped baffle piece is connected to one end of the second baffle piece; and the arc-shaped baffle pieces of all the air duct pieces are located on the same circumference.

Further, the first baffle piece and/or the arc-shaped baffle piece and/or the second baffle piece is provided with connecting ears used for connecting the support plate and the housing.

A gas heater is characterized by comprising the rotary intake mechanism described above, and further comprising a furnace end mounted in a furnace end mounting hole on the support plate, and an air guide hood having a lower end disposed on the housing and covered on the flame outlet.

Further, it further comprises a secondary air supplement mechanism, wherein the secondary air supplement mechanism is disposed on the flame outlet of the housing, and the air guide hood is connected to the secondary air supplement mechanism.

Furthermore, the secondary air supplement mechanism comprises an air supplement pipe covered on the flame outlet; a support plate is disposed on the outer peripheral surface of the air supplement pipe; an air guide hood is covered on the air supplement pipe and the lower end thereof is connected to the support plate; a plurality of secondary air supplement ports are disposed on the support plate; a plurality of guide channels are disposed on the surface of the air supplement pipe; and one end of the guide channel is in communication with the secondary air supplement port, and the other end thereof extends to the upper end of the air supplement pipe.

Furthermore, the guide channel comprises two guide plates spirally arranged in parallel on the air supplement pipe, and the inner wall surface of the air guide hood is closely adhered to an end of the guide plate.

Further, the guide channel comprises a guide groove plate which is U-shaped in cross section and spirally formed in the length direction, and both ends of the guide groove plate are fixedly connected to the surface of the air supplement pipe.

Furthermore, the guide channel comprises two guide plates which are spirally arranged in parallel on the air supplement pipe, and further comprises an outer cover pipe, wherein the end of the guide plate is closely adhered to the inner wall of the outer cover pipe, and the air guide hood is sleeved on the outer cover pipe.

Furthermore, it further comprises a protective cover with a lower end being opened and an upper end being formed with a through hole; the protective cover is covered outside the secondary air supplement mechanism; an upper end face of the protective cover is flush with the support plate; and a vent hole is disposed on the peripheral surface of the protective cover.

Further, it further comprises a protective cover with a lower end being opened and an upper end being formed with a through hole, wherein the protective cover is covered outside the secondary air supplement mechanism; and the gas heater further comprises a support component for supporting the protective cover, so that a ventilation gap is provided between the lower end of the protective cover and the housing.

In summary, the utility model has the following beneficial effects.

The utility model forms a central spiral uniform wind field in the housing by means of an annular distribution of air duct pieces arranged between the support plate and the housing, so that the fuel gas and air are mixed more fully, and the height of the flame is increased in combination with the up-and-down convection during combustion. At the same time, the flame spirals up. Furthermore, the air duct piece of the present utility model is formed by baffle sheet metal, which is convenient to manufacture, simple in process, capable of mass production and reduces the production cost. It overcomes the problem of high machining costs of the flow guide cover in the prior art.

Figure 1:
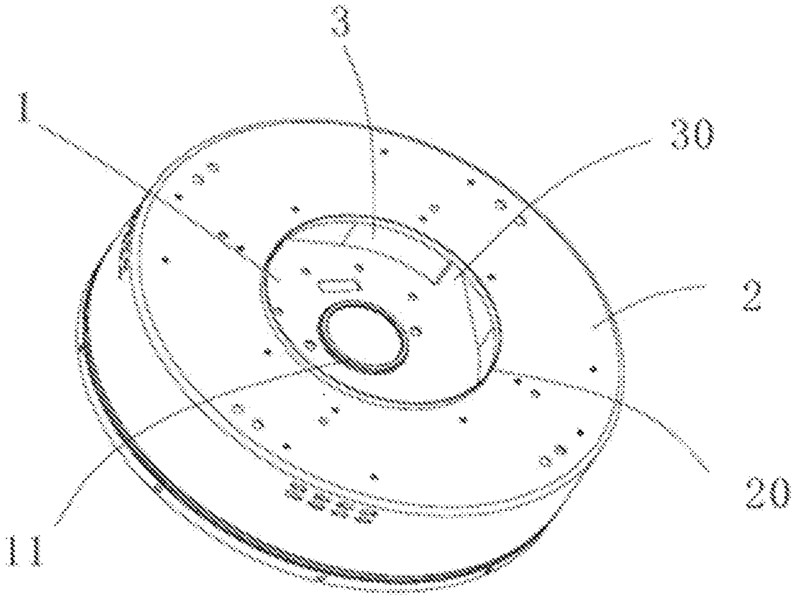
FIG. 1 is a schematic perspective view of a rotary intake mechanism.
Figure 2:
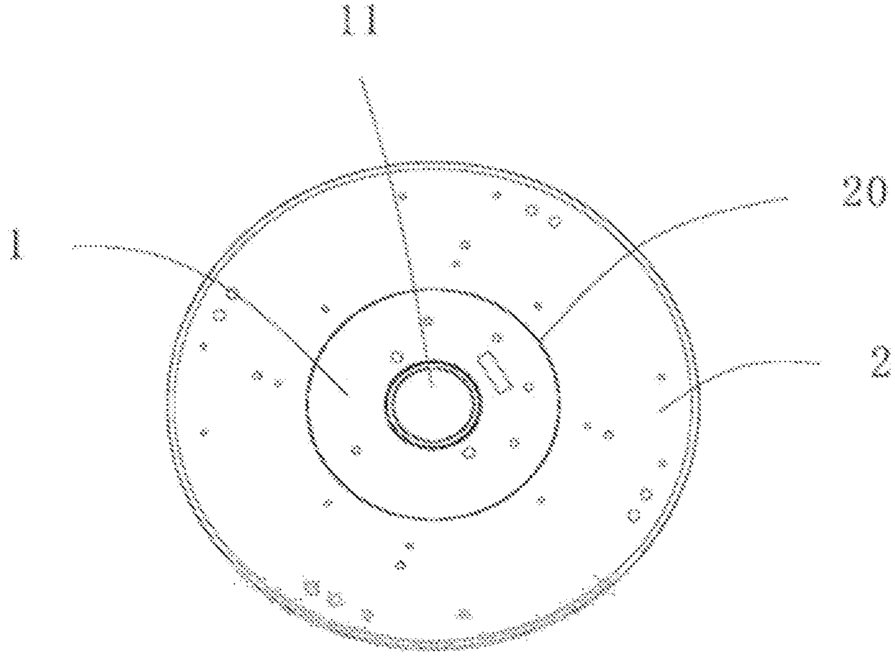
FIG. 2 is a schematic top view of a rotary intake mechanism.
Figure 3:
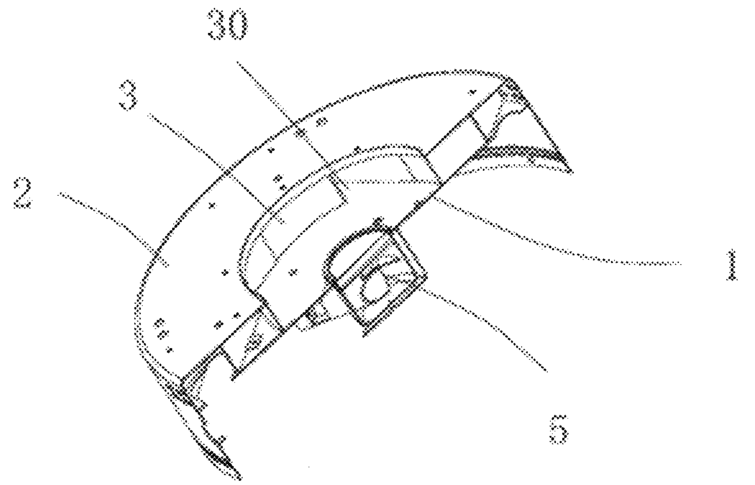
FIG. 3 is a semi-sectional perspective view of a rotary intake mechanism.
Figure 4:
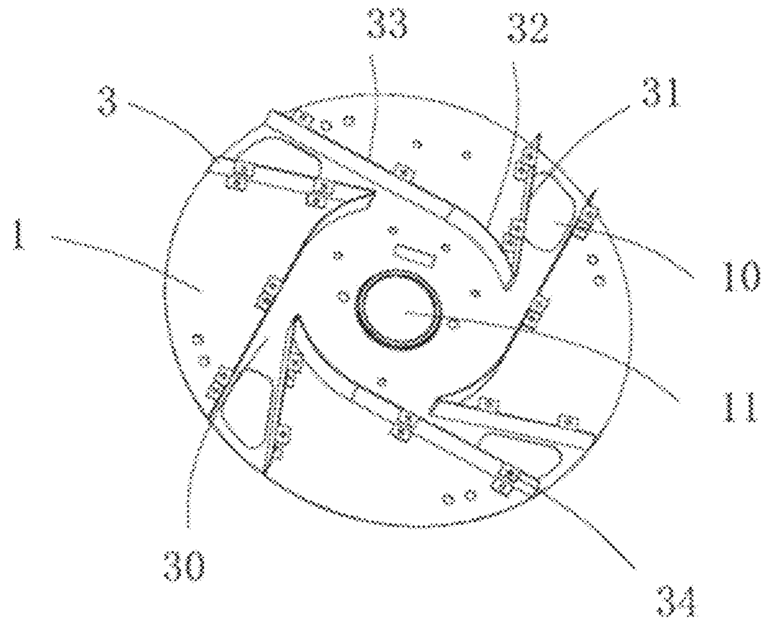
FIG. 4 is a schematic view showing the connection between an air duct piece and a support plate.
Figure 5:
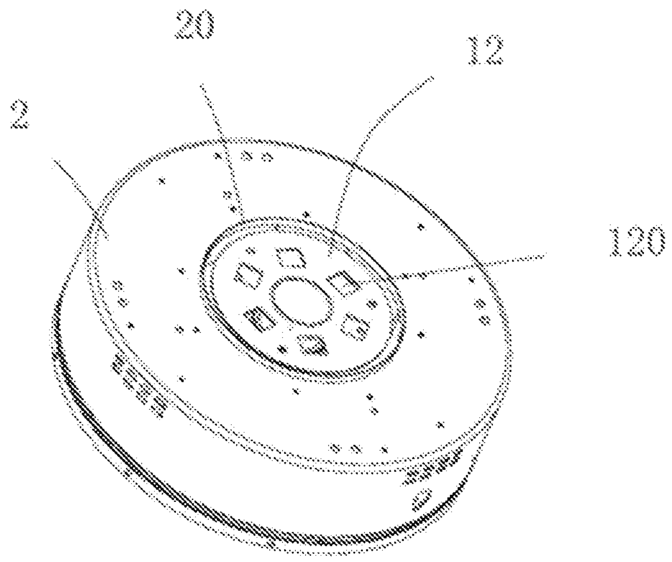
FIG. 5 is a schematic perspective view of a rotary intake mechanism with a fireproof plate installed.
Figure 6:
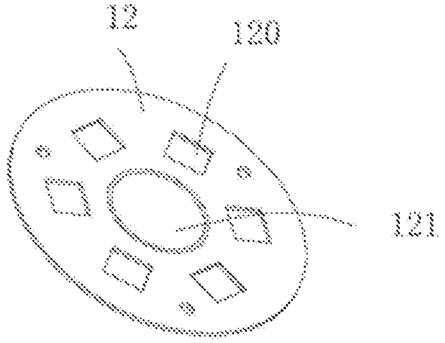
FIG. 6 is a schematic perspective view of a fireproof plate.

In the drawings, 1—support plate, 10—air inlet hole, 11—furnace end mounting hole, 12—fireproof plate, 120—flame dividing hole, and 121—arc-shaped spherical protrusion; 2—housing, 20—flame outlet, 3—air duct piece, 30—air duct, 31—first baffle piece, 32—arc-shaped baffle piece, 33—second baffle piece, and 34—connecting ear; 4—rotary intake mechanism, 5—furnace end, 6—air guide hood, 7—secondary air supplement mechanism, 70—air supplement pipe, 71—support plate, 72—guide channel, 710—secondary air supplement port, 720—guide plate, 721—guide groove plate, 722—outer cover pipe, 8—protective cover, 80—through hole, 81—vent hole, 9—support component, and 90—intake gap.

DETAILED DESCRIPTION OF THE INVENTION

The technical solutions in the embodiments of the utility model will be described clearly and completely in conjunction with the accompanying drawings in the embodiments of the utility model. Obviously, the described embodiments are only part of the embodiments of the utility model, rather than all of the embodiments. Based on the embodiments in the utility model, all other embodiments obtained by a person skilled in the art without involving any inventive effort are within the scope of protection of the utility model.

Referring to FIGS. 1 to 6, a rotary intake mechanism is characterized by including a support plate 1 and a housing 2 in which a flame outlet 20 is provided at the center of the housing 2, and further including a plurality of air duct pieces.

3. The support plate 1 is provided at the end or inside of the housing, and the support plate in the present embodiment is provided inside the housing. If the support plate is provided at the end of the housing, it is only necessary to adjust the height of the air duct pieces, and the support plate connected to the end of the housing may be larger than the housing. The plurality of air duct pieces 3 are located between the support plate and the housing and are connected to the support plate and the housing. Air ducts 30 for air flowing are formed between adjacent air duct pieces. The air ducts are distributed annularly to form a wind field spiraling towards the center. The support plate 1 is further provided with air inlet holes 10 corresponding to the ducts. A furnace end mounting hole 11 is provided at the center of the support plate 1.

The present utility model designs an intake mechanism of a gas heater. The intake mechanism forms a central spiral wind field by means of an annular distribution of air duct pieces between a support plate and a housing. Air enters the air duct from an air inlet hole, so that the air entering a combustion cavity of the heater has a spiral characteristic and the flame generated by combustion has a spiral upward shape. Furthermore, the air duct of the air inlet structure is formed by connecting the air duct pieces with the support plate and the housing. The structure of the air duct piece, the support plate and the housing is simple and convenient to manufacture, so that the generated production cost is effectively reduced.

Furthermore, a fireproof plate 12 is disposed in the flame outlet 20 and fixed on the support plate 1. A plurality of flame dividing holes 120 are circumferentially distributed on the fireproof plate 12. The flame generated by the combustion of the furnace end will converge towards the center, and the air flow entering from the air duct has less effect on the spiral rising of the flames. Thus, the flame is dispersed by the fireproof plate, and the dispersed flame is fled out from the flame dividing holes, and then multiple flames converge towards the center. Now, the air flow entering from the air duct may better improve the spiral shape and height of the flame.

Furthermore, the central part of said fireproof plate 12 is provided with a downward concave arc-shaped globular protrusion 121, and the arc-shaped globular protrusion is provided with a better guiding function, so that the flame can be uniformly dispersed in all directions, ensuring the uniformity of flame dispersion.

The number of the air duct pieces is three or more, and the number of the air duct pieces 3 in the present embodiment is four. The four duct pieces are fixedly fixed between the support plate and the housing to form four air ducts.

The shape of the air duct piece is further defined. The air duct piece 3 includes a first baffle piece 31, an arc-shaped baffle piece 32 and a second baffle piece 33. One end of the first baffle piece 31 is connected to one end of the arc-shaped baffle piece 32, and the other end of the arc-shaped baffle piece 32 is connected to one end of the second baffle piece 33. The arc-shaped baffle pieces 32 of all the air duct pieces are located on the same circumference. By defining the installation position of the arc-shaped baffle pieces, the air entering through the air duct enters a cavity where the fire baffle is located from the same circumference, reducing the mixed flow of the air, and ensuring the flow rate of the air. This allows better participation in the combustion and better rotation of the combustion flame. Furthermore, both the first baffle piece and the second baffle piece have one end abutting against the inner wall of the housing, ensuring a relative tightness of the air duct.

The first baffle piece 31 and/or the arc-shaped baffle piece 32 and/or the second baffle piece 33 is provided with connecting ears 34 used for connecting the support plate and the housing. The connecting ear is a connecting plate formed by bending the air duct plate. A connecting hole is disposed on the connecting plate. The connecting ear of the air duct plate can be connected by other means such as screws or rivets.

Embodiment I of Gas Heater

Figure 7:
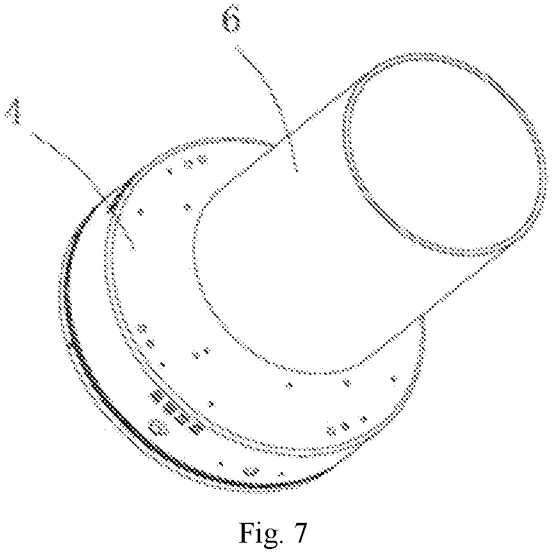
FIG. 7 is a schematic perspective view of Embodiment I of a gas heater.

Referring to FIG. 7, a gas heater is characterized by including the rotary intake mechanism 4, and further including a furnace end 5 mounted in a furnace end mounting hole 11 on the support plate 1, and an air guide hood 6 having a lower end air guide hood being disposed on the housing 2 and covered on the flame outlet 20. The air guide hood can be machined from various materials, such as, a glass tube, which has a transparent effect and enables the user to observe the shape of the flame in the air guide tube, and can improve the ornamental value. If there is no need for ornamental value, air guide hood can be made of stainless steel. Furthermore, according to the structure of the heater and the requirements of the user, the shape of the air guide hood can also be various, such as a round tube, a square tube, an oval tube, etc.

Embodiment II of Gas Heater

Figure 8:
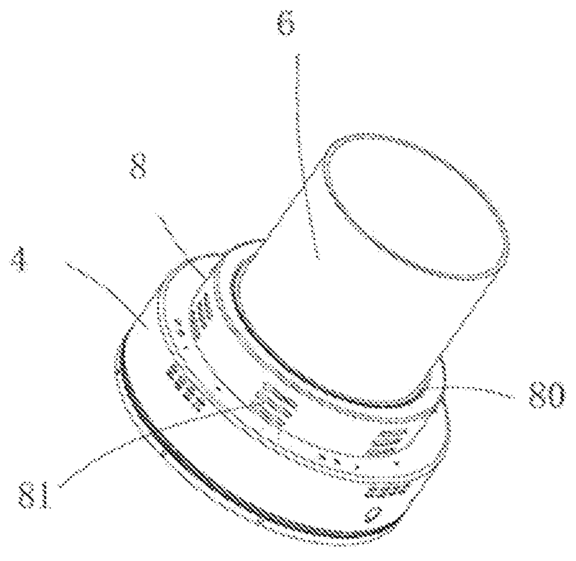
FIG. 8 is a schematic perspective view of Embodiment II of a gas heater.
Figure 9:
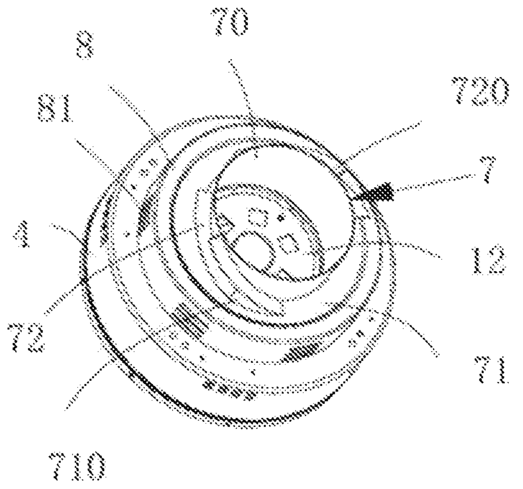
FIG. 9 is a schematic perspective view of Embodiment II of the gas heater with an air guide hood removed.

Referring to FIGS. 8 and 9, a gas heater is characterized by including the rotary intake mechanism 4, and further including a furnace end 5 mounted in a furnace end mounting hole 11 on the support plate 1, and an air guide hood 6 having a lower end air guide hood disposed on the housing 2 and covered on the flame outlet 20.

Furthermore, a secondary air supplement mechanism 7 is further included. The secondary air supplement mechanism 7 is disposed on the flame outlet 20 of the housing. The air guide hood 6 is connected to the secondary air supplement mechanism 7. The arranged secondary air supplement mechanism increases the air entering into the air guide hood, so that the combustion increases sufficiently.

The secondary air supplement mechanism 7 includes an air supplement pipe 70 covered on the flame outlet. The flame generated by the combustion of the furnace end enters the air supplement pipe after exiting from the flame outlet and continues to ascend. A support plate 71 is disposed on the outer peripheral surface of the air supplement pipe 70. The air guide hood 6 is sleeved on the air supplement pipe 70 and the lower end thereof is connected to the support plate 71. A plurality of secondary air supplement ports 710 is formed on the support plate 71, the secondary air supplement ports being openings provided on the support plate for air in. A plurality of spiral guide channels 72 are arranged on the surface of the air supplement pipe 70. One end of the guide channel 72 is in communication with the secondary air supplement port 710, and the other end extends to the upper end of the air supplement pipe 70. The guide channel is provided to guide the air entering from the secondary air supplement port, and has a certain function of collecting airflow. On the one hand, it increases the amount of air entering to ensure sufficient combustion. On the other hand, the airflow entering from the secondary air supplement mechanism has a certain flow speed, and can better drive the flame in the air guide hood to further rise, which may improve the combustion height of the flame. At the same time, the airflow of the secondary air supplement mechanism also has a spiral effect, and can better drive the flame to rotate, so as to obtain a better ornamental value.

The guide channel 72 in the present embodiment includes two guide plates 720 which are spirally arranged in parallel on the air supplement pipe 70, and the inner wall surface of the air guide hood 6 is closely adhered to an end of the guide plate 720. The guide channel in the present embodiment is formed by encirclement of the guide plate, the air supplement pipe and the inner wall of the air guide hood. In the present embodiment, the inner wall of the air guide hood must be adhered to the guide plate so as to better play the role of the guide channel.

Embodiment III of Gas Heater

Figure 10:
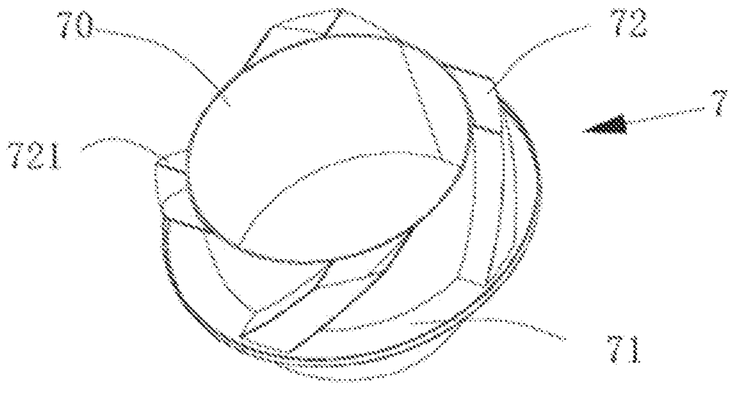
FIG. 10 is a schematic perspective view of a secondary air supplement mechanism in Embodiment III of the gas heater.
Figure 11:
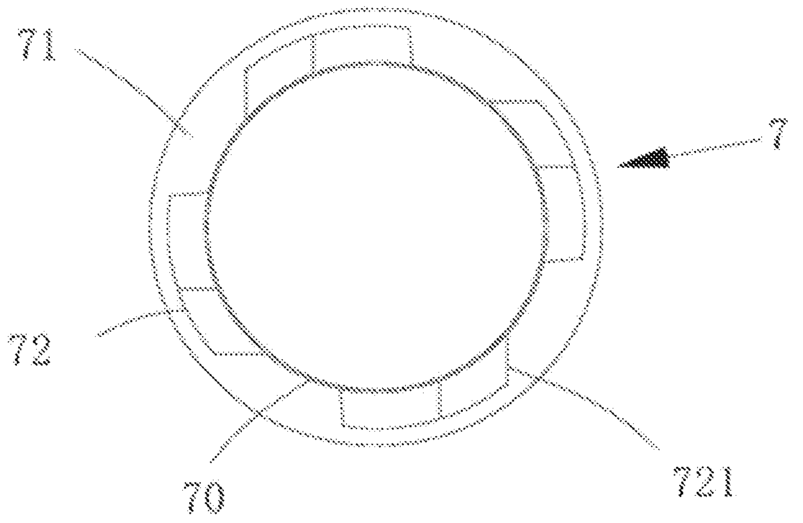
FIG. 11 is a schematic top view of the secondary air supplement mechanism in Embodiment III of the gas heater.

Most of the structures of this embodiment are the same as those of Embodiment II of the gas heater, with the difference that the structure of the guide channel in the secondary air supplement mechanism is different. With reference to FIGS. 10 and 11, the guide channel 72 includes a guide groove plate 721 which is U-shaped in cross section and spirally formed in the length direction. Both ends of the guide groove plate 721 are fixedly connected to the surface of the air supplement pipe 70.

Embodiment IV of Gas Heater

Figure 12:
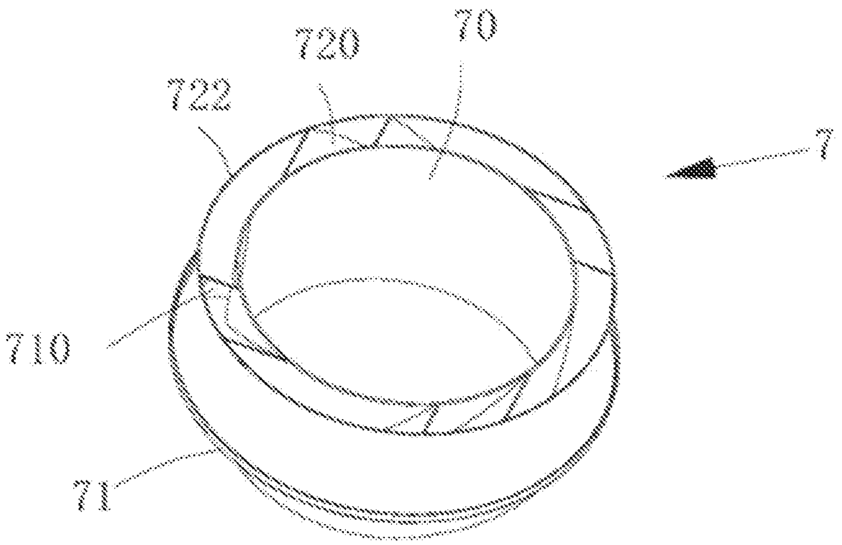
FIG. 12 is a schematic top view of a secondary air supplement mechanism in Embodiment 4 of a gas heater.

Most of the structures of this embodiment are the same as those of Embodiment II of the gas heater, with the difference that the structure of the guide channel in the secondary air supplement mechanism is different. With reference to FIG. 12, the guide channel 72 in this embodiment includes two guide plates 720 which are spirally arranged in parallel on the air supplement pipe, and further includes an outer cover pipe 722. The end of the guide plate is closely adhered to the inner wall of the outer cover pipe, and the air guide hood is sleeved on the outer cover pipe.

A further example of the above-mentioned gas heater further includes a protective cover 8 with a lower end being opened and an upper end being formed with a through hole 80. The protective cover 8 is covered outside of the secondary air supplement mechanism. An upper end face of the protective cover 8 is flush with the support plate 71. A peripheral face of the protective cover 8 is provided with a vent hole 81. The protective cover is used for improving the aesthetic appearance of the product.

Figure 13:
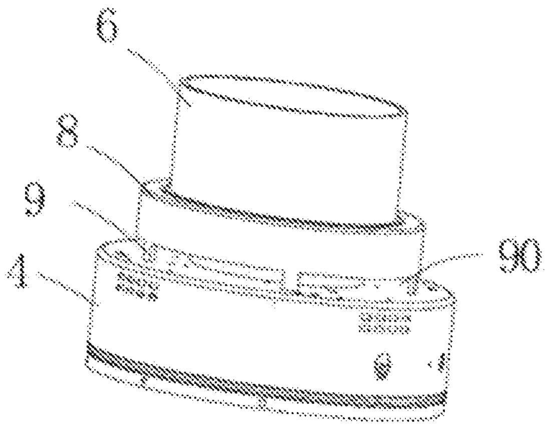
FIG. 13 is a perspective view showing another structural form of a protective cover mounted on a gas heater.

As shown in FIG. 13, it further includes a protective cover 8 with a lower end being opened and an upper end being formed with a through hole 80. The protective cover 8 is covered outside of the secondary air supplement mechanism. It further includes a support component 9 for supporting the protective cover, so that a ventilation gap 90 is provided between the lower end of the protective cover and the housing. On the one hand, the protective cover is provided for covering the secondary air supplement mechanism, so as to improve the aesthetic appearance of the product while performing the protection. At the same time, the reliability of the air inlet of the secondary air supplement mechanism needs to be considered. Without affecting the aesthetic appearance, the connection relationship between the protective cover and the housing is formed here by providing support members. On the one hand, the protective cover is effectively carried, and on the other hand, the ventilation gap formed can better ensure the inflow of air. The support members are a plurality of support pieces fixedly connected to the housing. One side of the upper surface of the support pieces forms a sunken bearing surface, and the end of the protective cover is connected to the bearing surface, or a plurality of support legs are welded or directly stamped and formed at the lower end of the protective cover, with the lower ends of the support legs being connected to the housing.

In summary, the utility model has the following beneficial effects.

1. The utility model forms a central spiral wind field in the housing by means of an annular distribution of air duct pieces arranged between the support plate and the housing, so that the fuel gas and air are mixed more fully, and the height of the flame is increased in combination with the up-and-down convection during combustion. At the same time, the flame spirals up. Furthermore, the air duct piece of the present utility model is formed by baffle sheet metal, which is convenient to manufacture, simple in process, capable of mass production and reduces the production cost. It overcomes the problem of high machining costs of the flow guide cover in the prior art.

2. The utility model fixes the secondary air supplement mechanism on the rotary intake mechanism, so that an intake channel communicating with the outside is formed between the air supplement pipe and the air guide hood, which further increases the oxygen in the air guide hood and enhances the force of the rotary air flow of the air guide hood. It further makes the flame fully burn and the secondary combustion of the fuel gas more fully, so that carbon deposition is not easily generated. It increases the combustion height of the flame, enhances the rotary effect of the combustion flame, and improves the ornamental value of the flame.

Finally, it should be noted that the above described is only preferred embodiments of the utility model, and is not intended to limit the utility model. Although the detailed description of the utility model is given with reference to the preceding embodiments, those skilled in the art may still modify the technical solutions described in the preceding embodiments or replace some of the technical features with equivalent ones. Any modifications, equivalents, improvements, etc. within the spirit and principles of this utility model are intended to be included within the scope of this utility model.

The invention claimed is:

1. A twisting flame producing device, comprising:
- a casing with a top opening and a bottom opening;
- a based plate with an installation hole and a plurality of bottom entry openings;
- a plurality of air flow channels placed on the based plate surrounding the installation hole,
- wherein each of the plurality of air flow channels is formed by a first channel wall connected to a second channel wall via an arc-shaped channel wall; and
- a flame retardation plate with an upside down dome in the center surrounded by plurality of flame isolation holes;
- whereby the twisting flame producing device is formed by placing the based plate with the plurality of air flow channels into the casing.

2. The twisting flame producing device of claim 1, further comprising
- a heater fitted underneath the based plate with flame coming through the installation hole.

3. The twisting flame producing device of claim 1, further comprising:
- a plurality of bottom tabs on a lower end of at least one of the first channel wall connected to the second channel wall via the arc-shaped channel wall;
- wherein the plurality of bottom tabs are connected with the based plate.

4. The twisting flame producing device of claim 1, further comprising:
- a plurality of top tabs on a top end of at least one of the first channel wall connected to the second channel wall via the arc-shaped channel wall and;
- wherein the plurality of top tabs are connected with a surface of the casing.

5. The twisting flame producing device of claim 1, wherein the flame from the heater is retarded by the upside down dome then divided into a plurality of flames rising through the plurality of flame isolation holes.

6. The twisting flame producing device of claim 5, wherein the plurality of flames creates a rising heat wave producing a vacuuming effect drawing twisting air-flow from the flow channel thus creating a twisting flame.

7. The twisting flame producing device of claim 6, further comprising:
- a secondary air flow device with a central opening placed on top of the casing.

8. The twisting flame producing device of claim 7,
- wherein the secondary air flow device includes a bottom portion with a plurality of air flow openings, and
- a top portion with a wall surrounded by a plurality of curved channels.

9. The twisting flame producing device of claim 8,
- Wherein the plurality of curved channels are each formed by a pair of curved walls, an inner wall and an outer wall.

10. The twisting flame producing device of claim 9, further comprising:
- a tube surrounding the plurality of curved channels;
- wherein the twisting flame forming a rising heat wave creates a vacuuming effect drawing air flow through the plurality of air flow openings from the plurality of curved channels to further enhance turbulence of the twisting flame.

11. The twisting flame producing device of claim 1, wherein the plurality of air flow channels circulates air flow horizontally.

12. The twisting flame producing device of claim 10, wherein the plurality of curved channels circulates air flow vertically.

* * * * *